Patented Apr. 25, 1939

2,156,217

UNITED STATES PATENT OFFICE 2,156,217

REDUCTION WITH METHANOL

Chester E. Andrews, Overbrook, and Merrell R. Fenske, State College, Pa., assignors to Röhm & Haas Company, Philadelphia, Pa.

No Drawing. Original application November 30, 1934, Serial No. 755,356. Divided and this application December 14, 1937, Serial No. 179,664

18 Claims. (Cl. 260—156)

This invention relates to a catalytic process for the reduction of organic products in which the reducing agent employed is methanol. This application is a division of our Serial No. 755,356 filed November 30, 1934.

According to the present invention the reduction may be carried out by heating the substance to be reduced and methanol in the presence of a suitable catalyst at elevated temperatures and pressures.

The process may be carried out in an autoclave or in a continuous flow system capable of withstanding the pressures and temperatures required. The temperatures used may vary from 200 to 500° C. and the pressures from atmospheric up to 300 atmospheres. Glycerides have been reduced at atmospheric pressure by this process. The process can be carried out in the liquid phase.

The catalyst chosen for any given reduction will depend on the nature of the material to be reduced and also on the end products desired. For instance, if it is desired to reduce an alcohol to a hydrocarbon, a metallic catalyst such as finely divided nickel may be used. If, on the other hand, it is desired to reduce an ester or a glyceride to the corresponding alcohol, an oxide catalyst may be used. For this purpose we have found that the best oxide catalysts are those which contain an oxide of a reducing metal, such as copper, iron, zinc, silver, manganese, cerium, etc., or mixtures, the oxide of an acid forming metal such as chromium, vanadium, molybdenum, etc., or mixtures, with or without, but preferably with an oxide of an alkaline earth metal such as barium, calcium, magnesium and strontium, or mixtures.

For this type of catalyst, however, we prefer to use one containing the oxides of copper, chromium and barium. In all cases whether a metallic catalyst or an oxide catalyst is used, they may be supported on an inert material such as alumina, kieselguhr, etc. In general, the catalysts suitable for use are those containing at least one metal selected from Groups I, II, V, VI, VII and VIII of the Periodic Table.

The metallic catalysts may be prepared in the ordinary manner by the reduction of the oxide and the oxide catalysts can be prepared in any known manner, such as precipitation of hydroxides, carbonates, etc. and subsequent ignition. When the catalyst contains two or more oxides, it may be prepared by the co-precipitation of the hydroxides and subsequent ignition, or the chromates for instance, of the metals may be precipitated together and subsequently ignited.

The time, temperature, pressure, quantity and composition of catalyst and ratio of reactants depend on the type of material being reduced and the products desired, and these will naturally be varied to suit the best conditions for any given reduction.

In addition to the methanol it is advantageous to have a substantial amount of water present as this increases the amount of reduction, due possibly to the interaction of the water with carbon monoxide formed from the decomposition of the methanol.

Our invention may be illustrated by the following examples—

*Example 1.*—80 grams lauryl laurate and 24 grams of methanol were mixed with 6 grams of a catalyst containing the oxides of copper, chromium and barium and heated to 350° C. under 500 pounds per square inch pressure for two hours. 73.5% of the lauryl laurate was reduced to lauryl alcohol.

*Example 2.*—40 grams of lauryl laurate, 192 grams of methanol were mixed with 25 grams of a catalyst containing the oxides of copper, chromium and barium and heated to 300° C. under 2900 pounds per square inch pressure for 6 hours. 16.6% of the lauryl laurate was reduced to lauryl alcohol.

*Example 3.*—80 grams of cocoanut oil and 48 grams of methanol were mixed with 6 grams of a catalyst containing the oxides of copper, chromium and barium and heated to 300° C. under 900 pounds per square inch pressure for 4 hours. 94.3% of the cocoanut oil was reduced.

*Example 4.*—80 grams of cocoanut oil and 48 grams of methanol were mixed with 6 grams of a catalyst containing the oxides of copper and cerium and heated to 300° C. under 500 pounds per square inch pressure for 4 hours. 11.4% of the cocoanut oil was reduced.

*Example 5.*—80 grams of cocoanut oil and 48 grams of methanol were mixed with 6 grams of a catalyst containing the oxides of copper, manganese and chromium and heated to 300° C. for 4 hours. 23.2% of the cocoanut oil was reduced.

*Example 6.*—80 grams of cocoanut oil and 48 grams of methanol were mixed with 6 grams of a catalyst containing the oxides of zinc, manganese and chromium and heated at 300° C. under 615 pounds per square inch pressure for 4 hours. 18.1% of the cocoanut oil was reduced.

*Example 7.*—240 grams of cocoanut oil and 144 grams of methanol were mixed with 18 grams of a catalyst containing the oxides of copper, chromium and barium and heated to 300° C. and 3600 pounds per square inch pressure for 4 hours. 85.2% of the cocoanut oil was reduced.

The foregoing examples illustrate the process as carried out in an autoclave equipped with suitable agitating device and the following examples show how the process may be carried out in a continuous flow system—

*Example 8.*—A reaction tube is filled with 300 cc. of a 12 to 20 mesh supported catalyst containing the oxides of copper, chromium and barium. Cocoanut oil and methanol were passed together over this catalyst at the rates of 45.0 and 43.8 grams per hour respectively, at a temperature of 300° C. and 700 pounds per square inch pressure. 8.9% of the cocoanut oil was reduced.

*Example 9.*—Using the same catalyst as in Example 8, a saturated solution of methanol in lauryl laurate containing about 12% by volume of methanol was passed over the catalyst at the rate of 24.3 grams of lauryl laurate per hour at a temperature of 300° C. and 400 pounds pressure. 11.5% of the lauryl laurate was reduced.

*Example 10.*—A mixture of methanol and acetone containing 66% by volume of methanol was passed over 60 cc. of a catalyst containing the oxides of copper, chromium and manganese at the rate of 200 cc. per hour at 300 to 325° C. and a pressure of 3000 pounds per square inch. The resulting liquid contained 59% of isopropyl alcohol, 16% of polymers or condensation products and 25% of acetone.

*Example 11.*—A mixture of methanol and capryl alcohol (methylhexyl carbinol), containing 50% by volume of methanol, was passed over 60 cc. of a catalyst made up of metallic nickel on activated alumina, at a rate of approximately 500 cc. per hour. The temperature varied from 385° to 440° C., and the pressure was 3000 pounds per square inch. The liquid product contained approximately 13.3 volume per cent normal octane, and 26.7 per cent octene, the balance being essentially unchanged alcohol. An exit gas analysis typical of this run showed 23 to 35 per cent of carbon dioxide, practically no unsaturated material, from 0 to 10 per cent hydrogen, and 50 to 60 per cent methane.

*Example 12.*—This example shows the effect of water on this reaction. A mixture containing 16% by volume of water, 42% methanol, and 42% capryl alcohol, was passed over 60 cc. of a metallic nickel on alumina catalyst at the rate of approximately 1500 cc. per hour. The temperature varied between 400 and 450° C. and the pressure was 3000 pounds per square inch. The resulting product contained about 13.5 volume per cent normal octane, and 26.4 per cent octene, the balance being essentially unchanged alcohol. Thus, even though the rate of flow had been increased threefold, approximately the same yields resulted.

*Example 13.*—Cocoanut oil was reduced with methanol at 300° C. and a pressure of 2400 pounds per square inch in four hours' time over a catalyst comprising oxides of copper, zinc and chromium with a reduction of 74.5%.

*Example 14.*—The following is the data on a run which was made on cocoanut oil at atmospheric pressure—

Charge: 35.4 lbs. cocoanut oil—hydroxyl number=7.3; 52.0 lbs. methanol; 1.8 lbs. copper-chromium-barium oxide catalyst.
Temperature, 290° C.
Time, 18.7 hours.
Pressure, atmospheric.
Product, 86.5 lbs.

After removal of catalyst, methanol, glycerine and water, the product gave a hydroxyl number of 48.4 which indicates that 15.7% of the cocoanut oil was converted to alcohols.

In carrying out this run, the catalyst and cocoanut oil was put in a ten gallon kettle provided with an agitator. The contents of the kettle were heated to 290° C. with the agitator operating and the methanol pumped at a constant rate into the bottom of the kettle and allowed to mix with the catalyst and cocoanut oil.

The following table gives details of reductions over a catalyst containing oxides of copper, chromium and barium. In cases where cocoanut oil was reduced, the product was the alcohols corresponding to the acids in the cocoanut oil.

*Table*

| Amount of catalyst, g. | Substance | g. | Sap. No. | Methanol, g. | Time, hrs. | Temp., °C. | Pressure, lb./sq. inch | Percent reduced | Product |
|---|---|---|---|---|---|---|---|---|---|
| 5 | Toluene | 46 | | 48 | 4 | 300 | 1475 | 47.7 | Methyl cyclohexane. |
| 8 | Cocoanut oil | 80 | 256 | 48 | 4 | 300 | 1675 | 71.0 | |
| 5 | Acetone | 58 | | 32 | 2 | 300 | 1100 | 87.3 | Isopropyl alcohol. |
| 5 | Cotton seed oil | 80 | 193.3 | 32 | 2 | 300 | 650 | 70.3 | 70.3% saturated double bond. |
| 6 | Benzene | 39 | | 48 | 4 | 300 | 1325 | 57 | Cyclohexane. |
| 6 | Lauryl alcohol | 80 | | 48 | 4 | 300 | 1000 | 57.8 | Hydrocarbons corresponding to lauryl alcohol. |
| 8 | Cocoanut oil | 80 | 256 | 48 | 4 | 300 | | 76 | |
| 6 | Phenol | 48 | | 48 | 4 | 300 | 975 | 15 | Cyclohexanol. |
| 6 | Diisobutylene | 80 | | 48 | 4 | 300 | 1675 | 82.5 | 2, 2, 4, trimethylpentane. |
| 8 | Cocoanut oil | 80 | 256 | 88 | 8 | 300 | | 79.1 | |
| 6 | Benzaldehyde | 60 | | 48 | 4 | 900 | | 26.9 | Toluene and benzyl alcohol. |
| 8 | Cocoanut oil | 80 | 256 | 48 | 4 | 300 | 1500 | 64.2 | |
| 6 | Dilauryl sebacate | 80 | 211.5 | 48 | 4 | 300 | 1010 | 15 | Lauryl alcohol and decane diol 1, 10. |
| 8 | Cocoanut oil | 80 | 256 | 48 | 4 | 300 | | 78 | |
| 8 | do | 80 | | 24 | 4 | 300 | 1240 | 48.8 | |
| 4 | do | 80 | 256 | 48 | 4 | 300 | 2000 | 58.8 | |
| 6 | Pyridine | 80 | | 72 | 4 | 300 | 1225 | 34 | Piperidine. |
| 8 | Cocoanut oil | 100 | 256 | 60 | 4 | 300 | 1950 | 88.0 | |
| 6 | Acetamide | 59 | | 48 | 4 | 300 | 1000 | 7.4 | Ethylamine. |
| 6 | Cocoanut oil | 80 | 256 | 48–9 gm. H₂O | 4 | 300 | 1550 | 2.5 | |
| 6 | Nitrobenzene | 60 | | 48 | 2 | 300 | 1000 | 40 | Aniline. |
| 6 | Diphenyl oxide | 80 | | 48 | 4 | 300 | 1100 | 75.4 | Benzene, cyclohexane, methyl ether of phenol and cyclohexanol. |
| 6 | Fish oil | 80 | | 48 | 2 | 300 | 625 | 62.0 | Double bond hydrogenation (saturation) (hardening). |

It is understood that the above examples are given by way of illustration and not limitation and that the scope of the invention is limited only by the following claims.

What we claim is:

1. The process of preparing alcohols from an organic compound containing a carbonyl group which comprises heating said organic compound with methanal to a temperature of from 200° C. to 500° C. in the presence of an intimate mixture of an oxide of a reducing metal and an oxide of an acid forming metal.

2. The process of preparing alcohols from an organic compound containing a carbonyl group which comprises heating said organic compound with methanol to a temperature of from 200° C. to 500° C. in the presence of an intimate mixture of an oxide of a reducing metal, an oxide of an acid forming metal, and an oxide of an alkaline earth metal.

3. The process of preparing alcohols from an organic compound containing a carbonyl group which comprises heating said organic compound with methanol to a temperature of from 200° C. to 500° C. in the presence of an intimate mixture of copper oxide and an oxide of an acid forming metal.

4. The process of preparing alcohols from an organic compound containing a carbonyl group which comprises heating said organic compound with methanol to a temperature of from 200° C. to 500° C. in the presence of an intimate mixture of copper oxide, chromium oxide, and an oxide of an alkaline earth metal.

5. The process of preparing alcohols from an organic compound containing a carbonyl group which comprises heating said organic compound with methanol to a temperature of from 200° C. to 500° C. in the presence of an intimate mixture of copper oxide, chromium oxide, and barium oxide.

6. The process of preparing alcohols from esters of organic carboxylic acids which comprises heating said ester with methanol to a temperature of from 200° C. to 500° C. in the presence of an intimate mixture of an oxide of a reducing metal and an oxide of an acid forming metal.

7. The process of preparing alcohols from esters of organic carboxylic acids which comprises heating said ester with methanol to a temperature of from 200° C. to 500° C. in the presence of an intimate mixture of copper oxide, chromium oxide, and an oxide of an alkaline earth metal.

8. The process of preparing alcohols from esters of organic carboxylic acids which comprises heating said ester with methanol to a temperature of from 200° C. to 500° C. in the presence of an intimate mixture of copper oxide, chromium oxide, and barium oxide.

9. The process of preparing alcohols from esters of fatty acids which comprises heating said ester with methanol to a temperature of from 200° C. to 500° C. in the presence of an intimate mixture of an oxide of a reducing metal and an oxide of an acid forming metal.

10. The process of preparing alcohols from esters of fatty acids which comprises heating said ester with methanol to a temperature of from 200° C. to 500° C. in the presence of an intimate mixture of an oxide of a reducing metal, an oxide of an acid forming metal, and an oxide of an alkaline earth metal.

11. The process of preparing alcohols from esters of fatty acids which comprises heating said ester with methanol to a temperature of from 200° C. to 500° C. in the presence of an intimate mixture of copper oxide, chromium oxide, and barium oxide.

12. The process of preparing alcohols from naturally occurring fatty glycerides which comprises heating said glyceride with methanol to a temperature of from 200° C. to 500° C. in the presence of an intimate mixture of an oxide of a reducing metal and an oxide of an acid forming metal.

13. The process of preparing alcohols from naturally occurring fatty glycerides which comprises heating said glyceride with methanol to a temperature of from 200° C. to 500° C. in the presence of an intimate fixture of copper oxide and an oxide of an acid forming metal.

14. The process of preparing alcohols from naturally occurring fatty glycerides which comprises heating said glyceride with methanol to a temperature of from 200° C. to 500° C. in the presence of an intimate mixture of copper oxide, chromium oxide, and barium oxide.

15. The process of preparing alcohols from organic compounds containing a carbonyl group which comprises heating said organic compound with methanol and water to a temperature of from 200° C. to 500° C. in the presence of an intimate mixture of an oxide of a reducing metal and an oxide of an acid forming metal.

16. The process of preparing alcohols from esters of organic carboxylic acids which comprises heating said ester with methanol and water to a temperature of from 200° C. to 500° C. in the presence of an intimate mixture of an oxide of a reducing metal and an oxide of an acid forming metal.

17. The process of preparing alcohols from esters of fatty acids which comprises heating said ester with methanol and water to a temperature of from 200° C. to 500° C. in the presence of an intimate mixture of an oxide of a reducing metal and an oxide of an acid forming metal.

18. The process of preparing alcohols from naturally occurring fatty glycerides which comprises heating said glyceride with methanol and water to a temperature of from 200° C. to 500° C. in the presence of an intimate mixture of an oxide of a reducing metal and an oxide of an acid forming metal.

CHESTER E. ANDREWS.
MERRELL R. FENSKE.

CERTIFICATE OF CORRECTION.

Patent No. 2,156,217. April 25, 1939.

CHESTER E. ANDREWS, ET AL.

It is hereby certified that error appears in the printed specification of the above numbered patent requiring correction as follows: Page 3, first column, line 5, claim 1, for "methanal" read methanol; and that the said Letters Patent should be read with this correction therein that the same may conform to the record of the case in the Patent Office.

Signed and sealed this 20th day of June, A. D. 1939.

(Seal)

Henry Van Arsdale
Acting Commissioner of Patents.